United States Patent [19]

Andersen et al.

[11] Patent Number: 6,022,825
[45] Date of Patent: Feb. 8, 2000

[54] THERMALLY DURABLE LOW $H_2S$ THREE-WAY CATALYSTS

[75] Inventors: Paul J. Andersen, Norristown; Todd H. Ballinger, Audubon; Christopher J. Bennett, Exton, all of Pa.

[73] Assignee: Johnson Matthey Public Limited Company, London, United Kingdom

[21] Appl. No.: 09/004,575

[22] Filed: Jan. 8, 1998

[51] Int. Cl.⁷ .............................. B01J 23/00; B01J 23/40; B01J 23/42; B01J 21/04
[52] U.S. Cl. .................... 502/303; 502/304; 502/326; 502/333; 502/335; 502/337; 502/339; 502/439; 502/527.12; 502/527.15
[58] Field of Search ............................... 502/303, 304, 502/326, 327, 333–339, 415, 439, 500, 527.12, 527.15

[56] References Cited

U.S. PATENT DOCUMENTS

| | | | |
|---|---|---|---|
| 4,414,140 | 11/1983 | Setzer | 502/303 |
| 4,693,882 | 9/1987 | Setzer et al. | 502/303 |
| 4,727,052 | 2/1988 | Wan et al. . | |
| 4,755,498 | 7/1988 | Setzer et al. | 502/303 |
| 4,760,044 | 7/1988 | Joy, III et al. | 502/304 |
| 4,939,113 | 7/1990 | Tauster et al. | 502/304 |
| 5,015,617 | 5/1991 | Ohata et al. | 502/304 |
| 5,057,483 | 10/1991 | Wan . | |
| 5,081,095 | 1/1992 | Bedford et al. . | |
| 5,182,249 | 1/1993 | Wang et al. | 502/525 |
| 5,196,390 | 3/1993 | Tauster et al. | 502/304 |
| 5,254,519 | 10/1993 | Wan et al. | 502/304 |
| 5,286,699 | 2/1994 | Ohata et al. | 502/304 |
| 5,597,771 | 1/1997 | Hu et al. | 302/304 |

FOREIGN PATENT DOCUMENTS

| | | |
|---|---|---|
| 0 244 127 | 11/1987 | European Pat. Off. . |
| 0 351 197 | 1/1990 | European Pat. Off. . |
| 0 507 590 | 10/1992 | European Pat. Off. . |
| WO 93/09146 | 5/1993 | WIPO . |
| WO 93/10886 | 6/1993 | WIPO . |
| WO 98/03251 | 1/1998 | WIPO . |

*Primary Examiner*—Mark L. Bell
*Assistant Examiner*—Patricia L. Hailey
*Attorney, Agent, or Firm*—Ratner & Prestia

[57] ABSTRACT

Improved platinum group three-way catalyst composition comprising (a) a high temperature catalyst support material, (b) a low temperature catalyst support material, (c) at least one platinum group metal, and (d) a metal additive effective for the suppression of hydrogen sulfide emissions, that is disposed in a separate layer either under or over a layer comprising the constituents (a), (b), and (c), or in the same layer as the constituents (a), (b), and (c). When the metal additive is disposed in the same layer as the constituents (a), (b), and (c), (d) the metal additive is disposed in a physical structure that is segregated from the remaining components in the layer.

16 Claims, No Drawings

THERMALLY DURABLE LOW H₂S THREE-WAY CATALYSTS

TECHNICAL FIELD

This invention relates to catalysts used to remove undesirable components in the exhaust gas from internal combustion engines. More particularly, the invention is concerned with improved catalysts of the type generally referred to as three-way conversion or TWC catalysts.

BACKGROUND

The exhaust from internal combustion engines contains hydrocarbons, carbon monoxide and nitrogen oxides which must be removed to levels established by various government regulations. The aforementioned three-way catalysts are polyfunctional in that they have the capability of substantially simultaneously catalyzing the oxidation of hydrocarbons and carbon monoxide and the reduction of nitrogen oxides.

Typical three-way catalysts which exhibit good catalytic activity and long life contain one or more platinum group metals (e.g. Pt, Pd, Rh, Ru and Ir) located upon a high surface area porous refractory oxide support, e.g. a high surface area alumina coating. The porous refractory oxide support is carried on a suitable non-porous refractory substrate such as a monolithic carrier comprising a refractory ceramic or metal honeycomb structure or refractory particles such as spheres, pellets or short extruded segments of a suitable refractory material.

Three-way catalysts are currently formulated with complex washcoat compositions containing stabilized alumina, an oxygen storage component (primarily stabilized ceria) and precious metal catalytic components. The term "oxygen storage component" is used to designate a material which is capable of being oxidized during oxygen-rich (lean) cycles of engine operation and reduced during oxygen-poor (rich) cycles of engine operation.

The art has devoted a great deal of effort in attempts to improve the efficiency of palladium containing three-way catalysts. Thus, in an article in Third Int. Cong. Catal. and Auto Poll. Controls, Pre-print Vol. 1, pages 125 to 135, the authors, Dettling et al., describe the inclusion of a low temperature catalyst component ($Pd/Al_2O_3$) and a high temperature catalyst component ($Pd/CeO_2$) in the same catalyst composition for high activity under both low and high operating temperatures.

Additionally, U.S. Pat. Nos. 5,057,483 and 4,727,052 and EPA 92302928.4 describe palladium containing three-way catalysts.

Catalysts of this type exhibit greatly improved three-way catalytic activity over the prior art, even after extended high temperature aging. Three-way catalysts have the desirable feature of converting pollutants found in automotive exhaust to harmless gases. For instance, hydrocarbons, carbon monoxide, and nitrogen oxides are converted to carbon dioxide, water, and nitrogen. However, these and other similar three-way catalysts also have the undesirable feature of converting sulfur compounds found in automotive exhaust, such as sulfur dioxide, to hydrogen sulfide under specific vehicle operating conditions. Also, in many cases, as the three-way catalyst activity increases through formulary improvements, the hydrogen sulfide generation activity usually also increases. Additives, such as NiO, can be included in the three-way washcoat to reduce its hydrogen sulfide generation activity, however, these additives can also reduce the thermal durability of the three-way catalyst, especially at extended high temperature aging. The mechanism of this deactivation is not completely clear. However, it is thought to result from undesirable solid state reactions which occur between the catalyst components and the hydrogen sulfide suppressing additive when the composite catalyst is exposed to high temperatures.

SUMMARY OF THE INVENTION

Platinum group metal three-way catalysts containing a high temperature functional component, a low temperature functional component, and an additive to reduce hydrogen sulfide emissions, prepared in accordance with the present invention, exhibit a reduction in hydrogen sulfide emissions without substantial reduction in the thermal durability of the catalyst, even at extended high temperature aging.

The catalyst composition of this invention differs from prior three-way catalysts by including an additive effective for hydrogen sulfide suppression in a manner such that it is physically isolated from the remaining components of the catalyst material. Thus, the composition of the present invention comprises (a) a high temperature catalyst support material, (b) a low temperature catalyst support material, (c) at least one platinum group metal; and an additive effective for the suppression of hydrogen sulfide emissions from the catalyst, the additive, or at least some portion of it, being segregated from the main catalyst elements, such as to be to some degree isolated from it. This $H_2S$ emission suppressant, typically nickel oxide, which is preferred, or a similar metal compound may be disposed in a separate layer either under or over a layer comprising the constituents (a), (b), and (c), or in the same layer as constituents (a), (b), and (c), in which case the additive is part of a physical structure that is segregated from the remaining components of the layer.

In one embodiment of the present invention, the high temperature catalyst support material is a zirconium-stabilized ceria containing, for example, about 58% $CeO_2$ and about 42% $ZrO_2$, and the low temperature catalyst support material is a lanthanum-stabilized alumina containing, for example, about 2 to 7% lanthanum oxide. The platinum group metal is selected from at least one of platinum, palladium, rhodium, ruthenium and iridium.

According to another embodiment of the present invention, when the additive effective for the suppression of hydrogen sulfide emissions is disposed in the same layer as constituents (a), (b), and (c), the additive is disposed in a physical structure that is segregated from the remaining components in the layer. Preferably, the physical structure comprises the additive supported on a $H_2S$ generation suppressant support material selected from the group consisting of $Al_2O_3$, $ZrO_2$, $SiO_2$, $TiO_2$, and stabilized $Al_2O_3$. Suitable stabilizers for alumina include La, Ba, and Zr with La being preferred.

As used herein, high temperature catalyst support material refers to catalyst support materials useful for catalytic activities at temperatures above 500° C., and low temperature catalyst support material refers to catalyst support materials useful for catalytic activities at temperatures in the range of 200° C. to 400° C.

DETAILED DESCRIPTION OF THE INVENTION

The present invention comprises an improved platinum group three-way catalyst composition containing a particulate high temperature catalyst support material, a particulate low temperature catalyst support material, and further including an additive effective for the suppression of hydrogen sulfide emissions, the $H_2S$ suppressant additive being disposed in either (a) a segregated layer either under or over a layer in which the remainder of the catalyst composition is disposed or (b) in the same layer as the remainder of the catalyst composition. When the $H_2S$ suppressant additive is in the same layer as the remainder of the catalyst composition, it is disposed in a physical structure, e.g. separated, disposed on an $H_2S$ suppressant carrier material by which it is segregated from the other catalyst constituents.

Generally, the high and low temperature catalyst support materials have a mean particle size of less than 20 microns, preferably between 1 and 20 microns and more preferably about 5 microns.

Further, the high temperature catalyst support material is an oxygen storage material selected from the group consisting of ceria, perovskites, NiO, $MnO_2$, and stabilized ceria. Suitable stabilizers for ceria include zirconium, lanthanum, aluminum, yttrium, praseodymium and neodymium, zirconium being most preferable.

Further still, the Zr-stabilized ceria contains 2 to 50% $ZrO_2$, a preferred composition being about 58% by weight $CeO_2$ and about 42% by weight $ZrO_2$.

Suitable low temperature catalyst support materials are stabilized alumina and unstabilized alumina. Suitable stabilizers for alumina include lanthanum, barium and zirconium, with lanthanum being preferred.

Preferably, the La-stabilized alumina contains 2 to 7% lanthanum oxide.

In the present invention, the platinum group metal comprises at least one of platinum, palladium, rhodium, ruthenium, and iridium.

In a preferred embodiment of the present invention, an additional $H_2S$ suppressant additive, i.e., a compound effective for the suppression of hydrogen sulfide emissions, is included in the main catalyst layer (without necessarily being segregated therefrom) in addition to the $H_2S$ suppressant additive contained in a physically segregated layer or support material.

Both the segregated and the non-segregated $H_2S$ suppression additives, which may be different compounds, are selected from the group consisting of BaO, CoO, $Fe_2O_3$, $MnO_2$, and NiO, NiO being most preferable.

According to the present invention, the additive effective for the suppression of hydrogen sulfide emissions in all cases, whether segregated or unsegregated from the main catalyst layer, contains a metal selected from the group consisting of Ba, Co, Fe, Mn, and Ni, Ni being most preferable.

In a preferred embodiment of the present invention, the additive is disposed as a compound in a separate layer over the main catalyst layer.

In another embodiment of the present invention, the additive is disposed in the same layer as the remainder of the catalyst but in a separate physical structure. In this case the additive comprises one of Ba, Co, Fe, Mn, and Ni, Ni being most preferable, and the compound containing that additive or the additive in metallic form is supported on a hydrogen sulfide suppressant support material which is selected from the group consisting of $Al_2O_3$, $ZrO_2$, $SiO_2$, $TiO_2$, and stabilized $Al_2O_3$. Suitable stabilizers for alumina include La, Ba, and Zr with La being preferred.

Formation of Basic Catalyst Layer

The improved compositions of the present invention include either one or two catalyst layers, but in all cases, the main catalyst layer is prepared by:

(a) preparing a first slurry containing a high temperature catalyst support material, preferably including an unsegregated compound effective for the suppression of hydrogen sulfide emissions, wherein the high temperature catalyst support material is of sufficiently large particle size so as to prevent the catalyst support material from forming a sol or a solution with the liquid medium of the first slurry;

(b) preparing a second slurry containing a low temperature catalyst support material, wherein the low temperature catalyst support material is of sufficiently large particle size so as to prevent the catalyst support material from forming a sol or a solution with the liquid medium of the second slurry;

(c) forming a washcoat layer by blending the first and second slurries and applying the blended slurries to a non-porous catalyst substrate that may be a refractory ceramic or metal honeycomb structure or refractory particles such as spheres, pellets or short extruded segments of a suitable refractory material;

(d) either before forming first and second slurries in (a) and (b) or after applying the washcoat layer in (c), impregnating each of the catalyst support materials with a platinum group metal selected from at least one of platinum, palladium, rhodium, ruthenium, and iridium or a combination thereof. The most common selections are palladium alone or combinations of rhodium with platinum or palladium or with palladium and platinum.

According to the present invention, the first slurry contains a high temperature catalyst support material selected from the group consisting of ceria, perovskites, NiO, $Pr_2O_3$, and stabilized ceria, with Zr-stabilized ceria being most preferable, and may contain an additional compound effective for the suppression of hydrogen sulfide selected from the group consisting of BaO, CoO, $Fe_2O_3$, $MnO_2$, and NiO, with NiO being most preferable.

The second slurry contains a low temperature catalyst support material that is either stabilized or unstabilized alumina, La-stabilized alumina being preferred.

Preferably, the catalyst support materials should not be in solution in the washcoat slurry or present as very small particles as found in a sol (the order of magnitude of the size of sol particles being in the nanometer range). The catalyst support materials in the washcoat slurry preferably should have a mean particle size of at least 1 micron, more preferably about 5 microns. However, if the particle size is too large (e.g. greater than 20 microns) there may be difficulty in getting the washcoat to adhere to the substrate.

The proportions of the high temperature catalytic component and the low temperature catalytic component required in the catalyst composition are determined by the respective water absorption capabilities of each catalyst support material and the respective amounts of each catalyst support material present in the washcoat.

Preferably, the water absorption capabilities of the high temperature catalyst support material and the low temperature catalyst support material are respectively about 0.2 to 1.0 ml/g and about 0.5 to 2.5ml/g.

The water absorption capabilities of the high temperature catalyst support material and the low temperature catalyst support material are important to the method of making the improved compositions because these water absorption capabilities relate not only to the process for making the catalyst composition but also to the specification of the catalyst formulation. The catalyst contains two oxide support materials, exemplified by Zr-stabilized ceria and La-stabilized alumina, although unstabilized alumina may be used. The platinum group metal(s) (exemplified by palladium) is split between the two oxide support materials.

In one embodiment of the invention, palladium is impregnated from an aqueous solution into the washcoat consisting of a mixture of the two oxide support materials. The way in which the palladium is split between the two oxides depends on the fraction of the aqueous impregnation solution absorbed by the respective oxides. For example, if it is required that 50% of the available palladium is to be supported on the La-stabilized alumina then the washcoat would be formulated so that the water absorption of the Zr-stabilized ceria in the catalyst composition, i.e. (ml water absorbed/g)×(g in catalyst), is equal to the water absorption of the La-stabilized alumina in the catalyst composition.

Thus, the ratio of the oxide support materials is specified by their relative water absorptions and the absolute amounts of the oxide support materials is specified by the amount of support needed in the catalyst composition (more specifically, for example, a certain amount of Zr-stabilized ceria is needed for adequate performance). The desired split of the palladium depends on the duty required of the catalyst composition. In some applications, equal amounts of high temperature catalytic component and low temperature catalytic components is required. In other applications, more high temperature compound than low temperature compound is required (or vice versa).

For example, catalyst compositions having palladium splits ranging from (a) 27% of Pd as $Pd/ZrCeO_2$—73% of Pd as $Pd/LaAl_2O_3$ to (b) 73% of Pd as $Pd/ZrCeO_2$—27% of Pd as $Pd/LaAl_2O_3$ have been prepared according to the methods of the invention.

In an alternative method of making the catalyst composition, a portion of the total palladium is impregnated into a bulk form of the high temperature catalyst support material (i.e., prior to slurry formation) and the remaining portion of the palladium is impregnated into a bulk form of the low temperature catalyst support material also prior to the formation of the washcoat slurry. Since the impregnated palladium is essentially insoluble in the washcoat it remains associated with the oxide support materials in the final catalyst composition. In this embodiment also, the ratio of the two oxide support materials is chosen on the basis of their relative water absorptions and the desired split between the palladium intimately associated with the Zr-stabilized ceria and the palladium intimately associated with the La-stabilized alumina.

Modification of Basic Catalyst Layer with $H_2S$ Suppressant Additive

According to one embodiment of the present invention, a second washcoat layer comprises a third slurry. This third slurry contains a particulate carrier material, such as La-stabilized alumina and an additive effective for the suppression of hydrogen sulfide emissions. The third slurry may be applied to the non-porous substrate either prior to application of the washcoat layer formed in step (c) above, or following application to the non-porous substrate of the platinum group metal impregnated washcoat layer formed in (c)(above). In the case of application the second layer after application of the first washcoat layer, the first layer is impregnated with a platinum group metal before the second layer is applied.

In this embodiment, the additive is selected from the group consisting of BaO, CoO, $Fe_2O_3$, $MnO_2$, and NiO, NiO being most preferable.

As with the first and second slurries, the solids in the third slurry should neither be present as sols, nor in solution.

In an alternative embodiment of the present invention, an additive effective for the suppression of hydrogen sulfide emissions and a hydrogen sulfide suppressant support material are combined to form a separate physical structure which is then included in the slurry formed in step (a) above. Prior to inclusion in the slurry, the support material is impregnated with the additive. Preferably, the additive contains a metal selected from the group consisting of Ba, Co, Fe, Mn, and Ni, Ni being most preferable. The support material is selected from the group consisting of $ZrO_2$, $SiO_2$, $TiO_2$, $Al_2O_3$ and stabilized $Al_2O_3$. Suitable stabilizers for alumina include La, Ba, and Zr with La being preferred.

According to either of the methods of the present invention, a catalyst promoter may be included with any of the catalyst layers. The catalyst promoter is a compound including a metal preferably selected from the group consisting of Nd, Ba, Ce, La, Pr, Mg, Ca, and Sr, Nd and Ba being particularly suitable. The catalyst promoter may be added to the slurries, as an insoluble compound such as barium sulfate or separately impregnated as a soluble compound such as barium acetate, after formation of the layer or layers.

COMPARATIVE EXAMPLE 1

Prior Three-Way Catalyst Composition with $H_2S$ Suppressant Material (NiO) Unsegregated in Catalyst Layer To form a single layer three-way catalyst composition, bulk NiO was slurried in water at a composition of about 4% by weight solids and wet milled to a mean particle size of about 6 microns. After the NiO slurry was wet milled; Zr-stabilized ceria with an incipient wetness water absorption of about 0.5 ml/g was added to the NiO slurry and the resulting slurry was wet milled further to a mean particle size of about 5 microns to form slurry A with a solids composition of about 65% by weight. Separately, La-stabilized alumina with an incipient wetness water absorption of approximately 1.85 ml/g was slurried in water at a composition of about 40% by weight solids to form slurry B. Slurry B was then wet milled to a mean particle size of about 5 microns. Slurry A and slurry B were blended in the ratio A:B=2.42:1 on a solids basis and adjusted to a solids composition of approximately 50% by weight and coated on a monolithic cordierite substrate by dipping. (The slurry blend could also be coated on the substrate by passing it through a washcoat curtain.) After blowing off the excess washcoat with compressed air, the coated substrate was then dried at 60° C. and calcined at 500° C. in flowing air. The coated substrate was impregnated with Pd:Rh:Nd from a $Pd(NO_3)_2$:$Rh(NO_3)_3$:$Nd(NO_3)_3$ solution which also contained 150 g/l citric acid. After impregnating, the coated substrate was then dried at 60° C. and calcined at 500° C. in flowing air. The coated, impregnated substrate was impregnated with barium, as a catalyst promoter, from a barium acetate solution. The composite was then dried at 60° C. and calcined at 500° C. in flowing air.

The total loading was 3.05 g/in$^3$ with a composition of 23.0% La-stabilized alumina, 52.5% Zr-stabilized ceria, 3.0% NiO, 7.0% $Nd_2O_3$, 13.4% BaO, and 0.99% Pd, and 0.11% Rh.

COMPARATIVE EXAMPLE 2

Prior Three-Way Catalyst Composition with a Higher Proportion of $H_2S$ Suppressant Material (NiO) Unsegregated in Catalyst Layer To form a single layer three-way catalyst composition, bulk NiO was slurried in water at a composition of about 4% by weight solids and wet milled to a mean particle size of about 6 microns. After the NiO slurry was wet milled; Zr-stabilized ceria with an incipient wetness water absorption of about 0.5 ml/g was added to the NiO slurry and the resulting slurry was wet milled further to a mean particle size of about 5 microns to form slurry A with a solids composition of about 65% by weight. Separately, La-stabilized alumina with an incipient wetness water absorption of approximately 1.85 ml/g was slurried in water at a composition of about 40% by weight solids to form slurry B. Slurry B was then wet milled to a mean particle size of about 5 microns. Slurry A and slurry B were blended in the ratio A:B=2.94: 1 on a solids basis and adjusted to a solids composition of approximately 50% by weight and coated on a monolithic cordierite substrate by dipping. (The slurry blend could also be coated on the substrate by passing it through a washcoat curtain.) After blowing off the excess washcoat with compressed air, the coated substrate was then dried at 60° C. and calcined at 500° C. in flowing air. The coated substrate was impregnated with Pd:Rh:Nd from a $Pd(NO_3)_2$:$Rh(NO_3)_3$:$Nd(NO_3)_3$ solution which also contained 150 g/l citric acid. After impregnating, the coated substrate was then dried at 60° C. and calcined at 500° C. in flowing air. The coated, impregnated substrate was impregnated with barium, as a catalyst promoter, from a barium acetate solution. The composite was then dried at 60° C. and calcined at 500° C. in flowing air.

The total loading was 3.41 g/in$^3$ with a composition of 20.5% La-stabilized alumina, 46.9% Zr-stabilized ceria, 13.5% NiO, 6.3% $Nd_2O_3$, 11.9% BaO, and 0.90% Pd, and 0.10% Rh.

EXAMPLE 1

Three-Way Catalyst with H$_2$S Suppressant in Separate Layer on Top of Catalyst Layer To form a two layer three-way catalyst composition, bulk NiO was slurried in water at a composition of about 4% by weight solids and wet milled to a mean particle size of about 6 microns. After the NiO slurry was wet milled; Zr-stabilized ceria with an incipient wetness water absorption of about 0.5 ml/g was added to the NiO slurry and the resulting slurry was wet milled further to a mean particle size of about 5 microns to form slurry A with a solids composition of about 65% by weight. Separately, La-stabilized alumina with an incipient wetness water absorption of approximately 1.85 ml/g was slurried in water at a composition of about 40% by weight solids to form slurry B. Slurry B was then wet milled to a mean particle size of about 5 microns. Slurry A and slurry B were blended in the ratio A:B=2.42:1 on a solids basis and adjusted to a solids composition of approximately 50% by weight and coated on a monolithic cordierite substrate by dipping. (The slurry blend could also be coated on the substrate by passing it through a washcoat curtain.) After blowing off the excess washcoat with compressed air, the coated substrate was then dried at 60° C. and calcined at 500° C. in flowing air. The coated substrate was impregnated with Pd:Rh:Nd from a $Pd(NO_3)_2$:$Rh(NO_3)_3$:$Nd(NO_3)_3$ solution which also contained 150 g/l citric acid. After impregnating, the coated substrate was then dried at 60° C. and calcined at 500° C. in flowing air.

A second washcoat layer was then prepared by comilling a La-stabilized alumina and NiO in a single slurry with La-stabilized alumina:NiO=1.72:1 in a slurry with a solids composition of approximately 30% by weight. After milling to a particle size of approximately 5 microns, the second washcoat layer was applied to the substrate containing the first layer. The coated substrate was then dried at 60° C. and calcined at 500° C. in flowing air. Barium was impregnated from a barium acetate solution. The coated substrate was then dried at 60° C. and calcined at 500° C. in flowing air.

The bottom (first) layer loading was 2.64 g/in$^3$ with a composition of 26.5% La-stabilized alumina, 60.6% Zr-stabilized ceria, 8.1% $Nd_2O_3$, 3.5% NiO, and 1.17% Pd, 0.13% Rh. The top (second) layer loading was 1.40 g/in$^3$ with a composition of 44.7% La-stabilized $Al_2O_3$, 29.1% BaO, and 26.2% NiO. The total loading was 4.04 g/in$^3$ with a composition of 32.9% La-stabilized alumina, 39.6% Zr-stabilized ceria, 5.2% $Nd_2O_3$, 10.0% BaO, 11.4% NiO, and 0.81% Pd, 0.09% Rh.

EXAMPLE 2

Three-Way Catalyst with Additional H$_2$S Suppressant in Catalyst Layer

To form a single layer three way catalyst composition with additional H$_2$S emission suppressant additive $Al_2O_3$/NiO powder was prepared with an incipient wetness impregnation procedure. More specifically, La-stabilized alumina was impregnated with an aqueous solution of nickel(II) nitrate to a ratio of 0.385 g Ni/g La-stabilized alumina. After impregnating the La-stabilized alumina with the nickel solution, the powder was dried overnight at 65° C. in flowing air and ground in a mortar and pestle. Finally, the powder was heated in air to 500° C. for 2 hours to completely decompose the nickel(II) nitrate forming NiO/La-stabilized alumina.

A washcoat slurry was formed by first milling NiO and NiO/La-stabilized alumina in water at a solids composition of about 45% by weight to a particle size of about 6 microns. Zr-stabilized ceria was then added to form slurry A such that the NiO:NiO/La-stabilized alumina:Zr-stabilized ceria ratio was 0.08:1:1.43. Slurry A, which had a solids composition of approximately 65% by weight, was milled further to a particle size of approximately 5 microns. A La-stabilized alumina slurry, slurry B, with a solids composition of approximately 40% was milled to a particle size of 5 microns. Slurry A and slurry B were then blended in a 4.0:1 ratio on a solids basis and the slurry was adjusted to a solids composition of approximately 50% by weight and coated on a monolithic cordierite substrate by dipping. After blowing off the excess washcoat with compressed air, the coated substrate was then dried at 60° C. and calcined at 500° C. in flowing air. The coated substrate was impregnated with Pd:Rh:Nd from a $Pd(NO_3)_2$:$Rh(NO_3)_3$:$Nd(NO_3)_3$ solution which also contained 150 g/l citric acid. After impregnation, the coated substrate was then dried at 60° C. and calcined at 500° C. in flowing air. The coated substrate then was again impregnated, this time with barium from a barium acetate solution. The composite was then dried at 60° C. and calcined at 500° C. in flowing air.

The total loading was 4.16 g/in$^3$ with a composition of 16.7% La-stabilized alumina, 38.5% Zr-stabilized ceria, 2.2% NiO, 26.9% NiO/La-stabilized alumina, 5.1% $Nd_2O_3$, 9.8% BaO, and 0.72% Pd, and 0.08% Rh.

EXAMPLE 3

Catalyst Testing with Additional H$_2$S Suppressant

For each catalyst formulation described in the preceding examples, a sample was placed in a laboratory reactor and stabilized in an SO$_2$ containing synthetic exhaust which contained more than the stoichiometric amount of oxygen ("lean") at an inlet temperature of 600° C. Each catalyst tested had an identical size and shape. After stabilization, the catalyst was subjected to four consecutive cycles in which the catalyst was exposed to a lean $SO_2$ containing exhaust for 15 minutes followed by a 5 minute condition in which the $SO_2$ containing synthetic exhaust contained less than the stoichiometric amount of oxygen ("rich"). Upon exposure to the rich condition, an amount of $H_2S$ was emitted from the catalyst which depended on the composition and preparation of the catalyst. The peak $H_2S$ concentration emitted from each catalyst during the rich portion of the fourth cycle is listed in Table 1.

Also, for each catalyst formulation described in the preceding examples, a separate sample was aged on an engine dynamometer cycle which simulates 100,000 miles of road aging. The engine dynamometer cycle had inlet temperatures ranging from 850° C. to 1000° C. and had a duration of 120 hours. After this aging the catalyst was fixed to a test engine dynamometer and the hydrocarbon (HC), carbon monoxide (CO), and nitrogen oxide (NOx) removal efficiencies were measured at various air/fuel ratios with a catalyst inlet exhaust temperature of 450° C. At an air/fuel near the stoichiometric point, the CO and NOx efficiencies are equal and this efficiency is referred to as the CO/NOx crossover point (COP). The COP for each catalyst after aging is also reported in Table 1 along with the HC efficiency at the same air/fuel ratio at which the COP occurs. The COP and HC efficiencies represent the Three-Way Catalyst activities for each example.

In this way, the catalysts produced in the comparative examples and examples described above were compared with respect to hydrogen sulfide emission with fresh catalyst and three-way catalyst activity after extended high temperature aging. Referring first to Comparative Examples 1 and 2, the data in the Table below indicates that higher $H_2S$ suppressant (NiO) loading reduces $H_2S$ emission in prior art catalysts but at significant cost in three-way catalyst activity after extended high temperature aging.

This is not true of the catalyst of the present invention shown by Examples 1 and 2, in which the extra $H_2S$ suppressant is disposed either in a separate layer from the catalyst layer (as in Example 1) or separately disposed on its own carrier material (as in Example 2). In these cases, as shown by the data in the Table below (and as shown by other data when the additional $H_2S$ suppressant is in an underlayer relative to the catalyst layer), relatively high three-way catalyst activity is maintained even after extended high temperature aging, while low $H_2S$ generation is also maintained.

TABLE 1

| Catalyst | Peak $H_2S$ (ppm) | Aged COP Eff. (%) | HC Eff. at COP air/fuel |
|---|---|---|---|
| Comparative Ex. 1 | 125 | 87 | 89 |
| Comparative Ex. 2 | 18 | 64 | 85 |
| Example 1 | 18 | 88 | 87 |
| Example 2 | 21 | 86 | 85 |

More specifically, Comparative Example 1 has high Three-Way Catalyst activity and high $H_2S$ emissions and Comparative Example 2 has low $H_2S$ emissions but low TWC activity. However, both Example 1 and Example 2, which are representative of the present invention, have the advantage of combined high TWC activity and low $H_2S$ emissions.

While this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from the invention's true spirit and scope.

We claim:

1. An improved platinum group three-way catalyst composition comprising:

(a) a high temperature catalyst support material;

(b) a low temperature catalyst support material;

(c) at least one platinum group metal;

said (a) (b) and (c) being disposed in a catalytic layer on a non-porous catalyst support substrate, wherein the improvement comprises:

(d) said composition also including an additive effective for the suppression of hydrogen sulfide emissions, said additive being disposed in a separate layer either under or over said catalytic layer or in the same layer as said catalytic layer, wherein when said additive is disposed in the same layer as said catalytic layer said additive is disposed in a physical structure that is segregated from the remaining components in said layer;

said additive consisting essentially of a metal selected from the group consisting of Ba, Co, Fe, Mn, Ni, and oxides thereof.

2. A composition according to claim 1, wherein (a) said high temperature catalyst support material is selected from the group consisting of ceria, perovskites, $MnO_2$, NiO, $Pr_2O_3$, and stabilized ceria;

(b) said low temperature catalyst support material is either stabilized or unstabilized alumina;

(c) said platinum group metal is selected from at least one of platinum, palladium, rhodium, ruthenium and iridium.

3. A composition according to claim 2, wherein (a) said high temperature catalyst support material is Zr-stabilized ceria;

(b) said low temperature catalyst support material is La-stabilized alumina.

4. A composition according to claim 1, wherein said additive is disposed in said separate layer under said catalytic layer.

5. A composition according to claim 1, wherein said metal additive is disposed in said separate layer over said catalytic layer.

6. A composition according to claim 1, wherein said additive is disposed in the same layer as said catalytic layer and in a physical structure that is segregated from the remaining components in said catalytic layer.

7. A composition according to claim 6, wherein said physical structure comprises said additive supported on a hydrogen sulfide suppressant support material, wherein said hydrogen sulfide suppressant support material is selected from the group consisting of $Al_2O_3$, $ZrO_2$, $SiO_2$, $TiO_2$, and La-stabilized $Al_2O_3$.

8. A composition according to claim 7, wherein said support material is La-stabilized alumina.

9. A composition according to claim 1, wherein said additive is NiO.

10. A composition according to claim 1, wherein said catalyst layer contains additional additive effective for the suppression of hydrogen sulfide, wherein said additional additive is selected from the group consisting of BaO, CoO, $Fe_2O_3$, $MnO_2$, and NiO.

11. A method of making an improved platinum group three-way catalyst composition comprising the steps of:

(a) preparing a first slurry containing a high temperature catalyst support material, wherein said high temperature catalyst support material is of sufficiently large particle size so as to prevent said catalyst support material from forming a sol or a solution with the liquid medium of said first slurry;

(b) preparing a second slurry containing a low temperature catalyst support material, wherein said low temperature catalyst support material is of sufficiently large particle size so as to prevent said catalyst support material from forming a sol or a solution with the liquid medium of said second slurry;

(c) forming a first washcoat layer by blending said first and second slurries and applying said blended slurries to a non-porous catalyst support substrate;

(d) impregnating each said catalyst support material with at least one platinum group metal either before or after forming said first washcoat layer;

wherein the improvement comprises:

(e) forming a second washcoat layer from a third slurry, wherein said third slurry contains a $H_2S$ suppressant support material and an additive effective for the suppression of hydrogen sulfide emissions and applying said second washcoat layer to said non-porous catalyst support substrate;

wherein said additive consists essentially of a metal selected from the group consisting of Ba, Co, Fe, Mn, Ni, and oxides thereof.

12. A method according to claim 11 wherein said third slurry is combined with said first and second slurries and said three slurries are applied together to said catalyst support substrate.

13. A method according to claim 11, wherein said second washcoat layer is applied on said non-porous catalyst substrate prior to application of said first washcoat layer.

14. A method according to claim 11, wherein said second washcoat layer is applied after application of said first washcoat layer.

15. A method according to claim 11, wherein (a) said high temperature catalyst support material is Zr-stabilized ceria;

(b) said low temperature catalyst support material is La-stabilized alumina.

16. A method according to claim 15, wherein said additive is NiO.

* * * * *